(12) United States Patent
Hikichi

(10) Patent No.: US 12,386,568 B2
(45) Date of Patent: Aug. 12, 2025

(54) IMAGE FORMING APPARATUS AND CONTROL METHOD FOR IMAGE FORMING APPARATUS

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 18/473,892

(22) Filed: Sep. 25, 2023

(65) Prior Publication Data

US 2024/0103782 A1 Mar. 28, 2024

(30) Foreign Application Priority Data

Sep. 27, 2022 (JP) .................... 2022-153335

(51) Int. Cl.
*G06F 3/12* (2006.01)
*G03G 15/00* (2006.01)

(52) U.S. Cl.
CPC ........... *G06F 3/1229* (2013.01); *G03G 15/50* (2013.01); *G06F 3/1221* (2013.01)

(58) Field of Classification Search
CPC ...... G06F 3/1229; G06F 3/1221; G03G 15/50

USPC ........................................... 358/1.14
See application file for complete search history.

(56) References Cited

U.S. PATENT DOCUMENTS

| 8,488,141 B2 * | 7/2013 | Kaneko | G03G 15/5012 |
| | | | 358/1.14 |
| 2009/0303517 A1 * | 12/2009 | Kaneko | G03G 15/5012 |
| | | | 358/1.14 |
| 2018/0349074 A1 * | 12/2018 | Nagai | G06F 3/1229 |

FOREIGN PATENT DOCUMENTS

JP 2012128705 A 7/2012

* cited by examiner

*Primary Examiner* — Allen H Nguyen
(74) *Attorney, Agent, or Firm* — Canon U.S.A., Inc.

(57) ABSTRACT

An image forming apparatus capable of transitioning between at least a standby state and a termination state, the image forming apparatus including a controller and a printer device configured to form an image on a recording sheet. The controller is configured to receive an event for transitioning a state of the image forming apparatus, and the controller is configured to, by executing a termination process of the printer device and a termination process of the controller, transition from the standby state to the termination state. When a reboot event is received by the controller, the controller controls to execute a termination process of the controller without executing a termination process of the printer device.

23 Claims, 8 Drawing Sheets

IMAGE FORMING APPARATUS AND CONTROL METHOD FOR IMAGE FORMING APPARATUS

BACKGROUND

Field of the Disclosure

The present disclosure relates to an image forming apparatus and a control method for an image forming apparatus.

Description of the Related Art

An image forming apparatus, in its standby state, can transition to a termination state upon receiving a termination event as a trigger, thereby reaching the termination state. The image forming apparatus has the function of terminating while protecting devices such as a printer and a scanner in order to extend the durability of paper printing. In other words, the image forming apparatus performs, as a termination process, both a printer termination process for printer protection and a controller termination process. In Japanese Patent Laid-Open No. 2012-128705, whether transitioning to a suspended state is possible is checked when a termination process is started, and if it is not possible, a shutdown process is initiated in the case where the termination process is a shutdown or a reboot.

SUMMARY

Some embodiments of an image forming apparatus are an image forming apparatus capable of transitioning between at least a standby state and a termination state, the image forming apparatus including a controller and a printer device configured to form an image on a recording sheet. The controller is configured to receive an event for transitioning a state of the image forming apparatus, and the controller is configured to, by executing a termination process of the printer device and a termination process of the controller, transition from the standby state to the termination state. When a reboot event is received by the controller, the controller controls to execute a termination process of the controller without executing a termination process of the printer device.

Further features of various embodiments will become apparent from the following description of exemplary embodiments with reference to the attached drawings.

DESCRIPTION OF THE EMBODIMENTS

Figure 1:
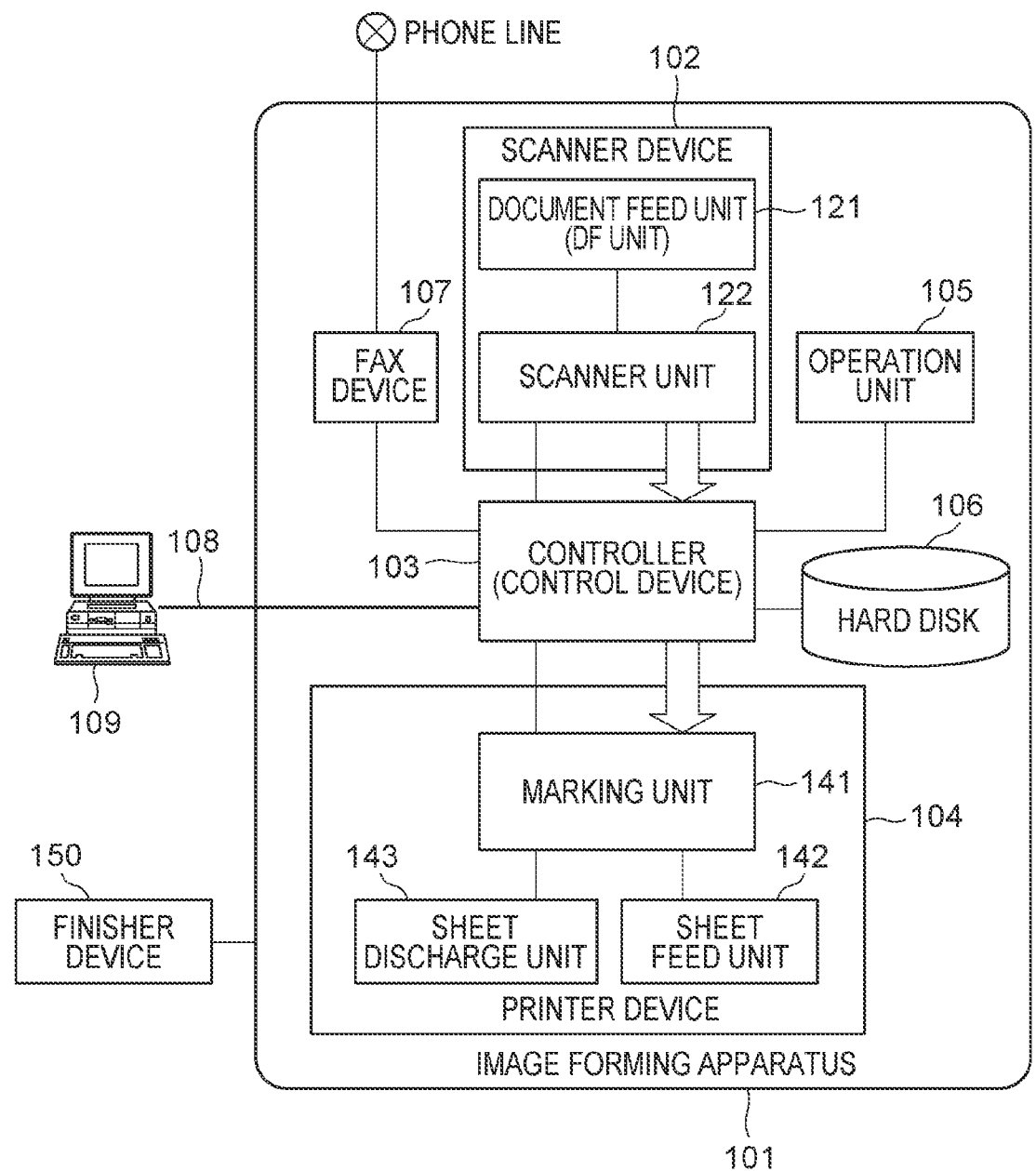
FIG. 1 is a block diagram of an example of an image forming apparatus (101).

First, the state transition and reboot processing of an image forming apparatus will be described.

A printer termination process may last more than one hour. In other words, even if the image forming apparatus starts rebooting, rebooting takes a long time in the case where the time taken by the printer termination process is long. Accordingly, when the system setting information is changed, for example, even if rebooting is performed to reflect the settings, rebooting may take a long time in the case where the time taken by the printer termination process is long, and the downtime of the image forming apparatus may increase, which may result in reduced convenience.

Some embodiments of the present disclosure provide an image forming apparatus, which requires time for a printer termination process, capable of shortening the time taken by a reboot process to enhance convenience.

Termination State, Termination Event, and Transition to Termination State

An image forming apparatus, in its standby state, can transition to a termination state upon receiving a termination event as a trigger, thereby reaching the termination state.

In other words, the image forming apparatus has the standby state, which displays functions provided by the image forming apparatus when an operation unit is operated by a user. Meanwhile, the image forming apparatus has the termination state, which energizes only a device for detecting a power switch operation while stopping the supply of power to devices other than the device for detecting a power switch operation. The image forming apparatus also has a function for accepting termination events such as shutdowns, reboots, and the like. Furthermore, the image forming apparatus performs state transition processes from the standby state to the termination state, such as device termination processes for protecting devices such as a printer and a scanner, and data storage processes for protecting data of applications.

Reboot Issuance Timing

The image forming apparatus starts a reboot process by receiving a reboot event, which is one of termination events. The reboot issuance timing includes when the image adjustment of a printer or a scanner is completed, or when a connection is retried in order to eliminate a communication error with a device such as a printer, a scanner, or the like. In addition, the reboot issuance timing includes when the update of the system or firmware controlling printing is completed, or upon reflection of changes made to the system configuration information.

Printer Termination Process and Execution Time

Furthermore, due to the prolonged printer termination process, the execution time of the overall system termination process in the image forming apparatus may be extended. The printer performs a printer termination process in order to extend its durability, which is the maximum number of paper prints. The printer termination process includes fan rotation control for printer cooling in order to prevent component degradation due to prolonged high temperatures, and fan rotation control for external ozone discharge in order to prevent toner from not adhering to the fixing unit and causing the printed image to smear. Cooling the printer by fan rotation can take up to an hour, and the printer termination process involves prolonged operation. Additionally, although the printer termination process crimps a fixing drum that fixes the paper and toner for printing at a high speed in its standby state, the printer termination process also involves the separation movement of the fixing drum in order to prevent the occurrence of image streaks during printing, caused by the prolonged crimping and hardening of the fixing drum. Furthermore, the printer termination process includes the closing operation of a charging shutter in order to prevent drying, which is for preventing the fixing drum from drying out and losing toner adhesion. The separation movement of the fixing drum and the closing operation of the charging shutter do not require time compared to the fan rotation control, and are operations performed in a short time.

Configuration of Power Supply Control of System

Meanwhile, the image forming apparatus may change the control entity of the power supply control unit of the image forming apparatus, such as in the case where the controller controls the power supply of the overall system or in the case where the printer controls the power supply of the overall system. In the former case, the printer can be rebooted by rebooting the controller. However, in the latter case, when the controller is rebooted, the printer cannot be rebooted, and the entire system is not reset, which may result in an error at the next activation.

Hereinafter, embodiments for implementing the present disclosure will be described using the drawings. Note that the following embodiments are not intended to limit every embodiment according to the claims. Although a plurality of features are described in the embodiments, not all of these features are essential to every embodiment, and the features may be arbitrarily combined. Furthermore, in the accompanying drawings, the same or similar configurations are given the same reference numerals, and overlapping descriptions are omitted.

First Embodiment

Configuration of System

FIG. 1 is a block diagram illustrating the configuration of an image forming system according to the present embodiment. This example is an example of a multi-function peripheral equipped with a printing function, a scanner function, a data communication function, and so on.

In FIG. 1, an image forming apparatus 101 is configured to be capable of receiving jobs from a computer 109 via a local area network (LAN) 108. Note that the number of connections to the computer 109 may be one or more. A scanner device 102 reads an image optically from a document and converts it into a digital image. A printer device 104 outputs the digital image to a recording sheet, such as a paper device called a sheet of paper. A printer device is also referred to as a printer unit. An operation unit 105 includes a touchscreen and hardware keys for accepting settings for the apparatus from a user and displaying a processing state. A hard disk 106 (also referred to as a hard disk drive (HDD)) stores digital images, control programs, and the like. The HDD 106 is a non-volatile storage device, which may be a solid state drive (SSD), an embedded multimedia card (eMMC), or the like. A FAX device 107 transmits and receives digital images to and from telephone lines and the like. A controller 103 is connected to the scanner device 102, the printer device 104, the operation unit 105, the hard disk 106, and the FAX device 107, and executes jobs on the image forming apparatus 101 by issuing instructions to the individual modules.

The image forming apparatus 101 is also capable of receiving and outputting digital images, issuing jobs, giving instructions to equipment, and so on using the computer 109 via the LAN 108. The scanner device 102 includes a document feed unit 121, which can automatically and sequentially replace a bunch of documents, and a scanner unit 122, which can optically scan a document and convert it into a digital image. The converted image data is transmitted to the controller 103.

The printer device 104 includes a sheet feed unit 142, which can sequentially feed one sheet at a time from a bunch of sheets of paper, a marking unit 141 for printing image data on the sheet of paper that has been fed, and a sheet discharge unit 143 for discharging the printed sheet. A finisher device 150 performs processing on a paper device output from the sheet discharge unit 143 of the printer device 104 of the image forming apparatus 101, such as discharging, sorting, stapling, punching, cutting, and so on.

Functions of System

Hereinafter, an example of executable jobs (functions) of the image forming apparatus 101 will be described.

Copy Function

The image forming apparatus 101 is equipped with a copy function that records an image read from the scanner device 102 to the hard disk 106 and simultaneously prints it using the printer device 104.

Image Transmission Function

The image forming apparatus 101 is equipped with an image transmission function that transmits an image read from the scanner device 102 to the computer 109 via the LAN 108.

Image Saving Function

The image forming apparatus 101 is equipped with an image saving function that records an image read from the scanner device 102 to the hard disk 106, and transmits the image or prints the image if necessary.

Image Printing Function

The image forming apparatus 101 is equipped with an image printing function that interprets, for example, a page description language transmitted from the computer 109, and prints it with the printer device 104.

Configuration of Operation Unit (105)

Figure 2:
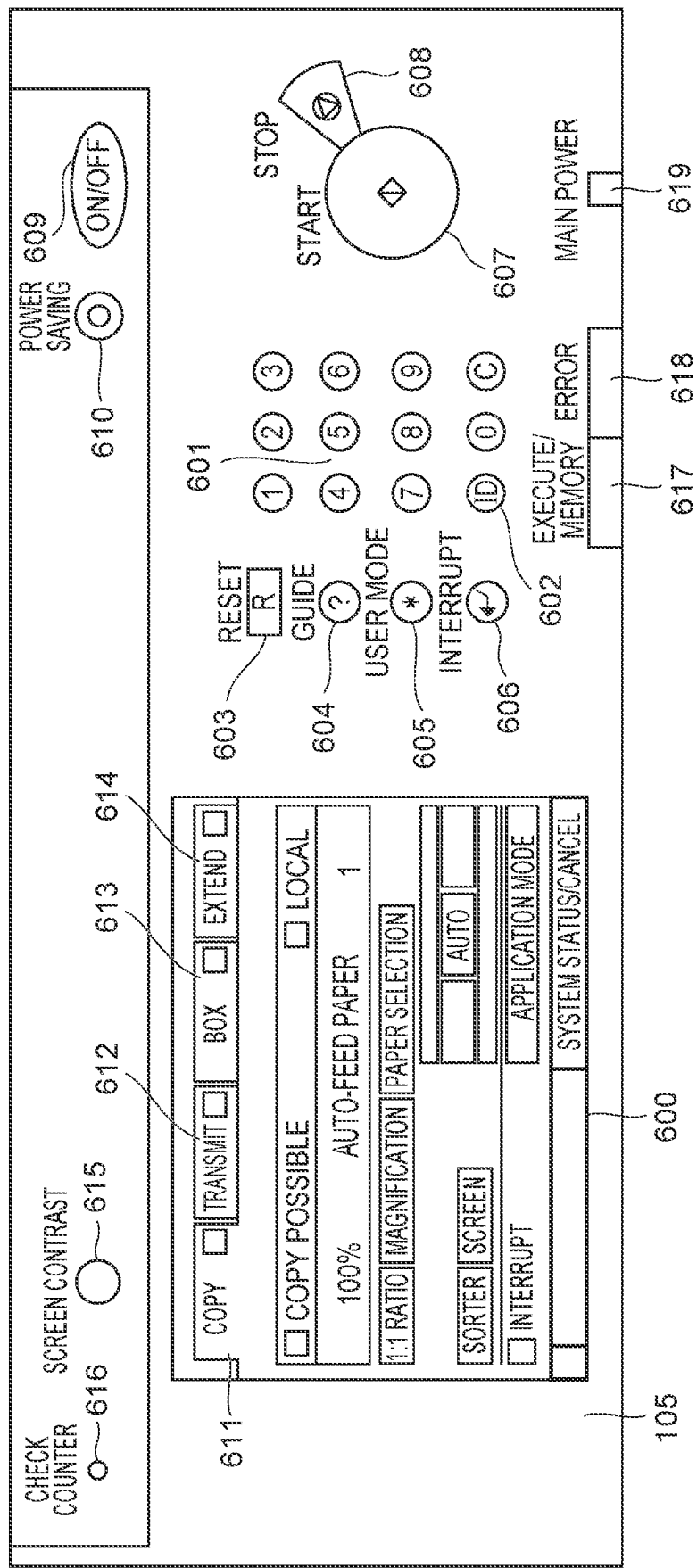
FIG. 2 is a block diagram of an example of an operation unit (105).

The operation unit 105 will be described using FIG. 2.

The operation unit 105 is connected to the controller 103 and provides a user interface for operating the image forming apparatus 101. The user interface is configured of a liquid crystal display (LCD) touchscreen 600, a backlight, a power saving button, a copy button, a cancel button, a reset button, a numeric keypad, a user mode key, a power supply tally light 619, and the like.

The LCD touchscreen 600 has a backlight that can be turned on and off, and performs main mode settings and state indications. Note that the LCD touchscreen 600 is also referred to as an operation panel. The control of turning the backlight on and off is under control of the controller 103 as a display control unit. The numeric keypad 601 is used to enter numerals from 0 to 9. An identification (ID) key 602 is used to enter a department number and a PIN mode when the device is under departmental control.

A reset key 603 is used to reset the set mode. A guide key 604 is used to display a description screen for each mode. A user mode key 605 is used to display a user mode screen. An interrupt key 606 is used to make interrupt copies.

A start key 607 is used to start a copy operation or the like. A stop key 608 is used to abort a copy job being executed.

A software power switch 609 triggers power supply control, power saving control, and sleep control when pressed. A power saving key 610, when pressed, triggers a transition to the sleep state, where the backlight of the LCD touchscreen 600 is turned off, and, when pressed again, triggers a resumption from the sleep state, where the backlight of the LCD touchscreen 600 is turned on. The software power switch 609 and the power saving key 610 may be made into a single switch, which, when pressed, triggers a transition to or a resumption from the sleep state.

Function keys are used to transition to the function screens of copy 611, transmit 612, box 613, and extend 614. The box 613 displays a function screen that saves an image to the hard disk 106. The LCD touchscreen 600 is in the state of displaying a standard screen of copy 611, and, when the other function keys, namely, transmit 612, box 613, and extend 614, are pressed, displays standard screens of the respective functions.

An adjustment key 615 is used to adjust the screen contrast of the LCD touchscreen 600. A counter checking key 616 displays a count screen that displays aggregations, such as the number of copies and the number of prints used so far.

A job tally light 617 indicates LED flicker patterns and color display that indicate that a job is being executed or that an image is being accumulated in an image memory. An error tally light 618 indicates LED flicker patterns and color display that indicate that the image forming apparatus 101 is in an error state, such as a paper jam or the door being open. The power supply tally light 619 indicates flicker patterns and color display that indicate that the main power switch of the image forming apparatus 101 is turned on or off, in a state transition, or the like.

These keys can also be implemented with hardware keys, or software keys displayed on the LCD touchscreen 600, and the presence of hardware is not necessarily required.

Block Diagram of Controller (103)

Figure 3:
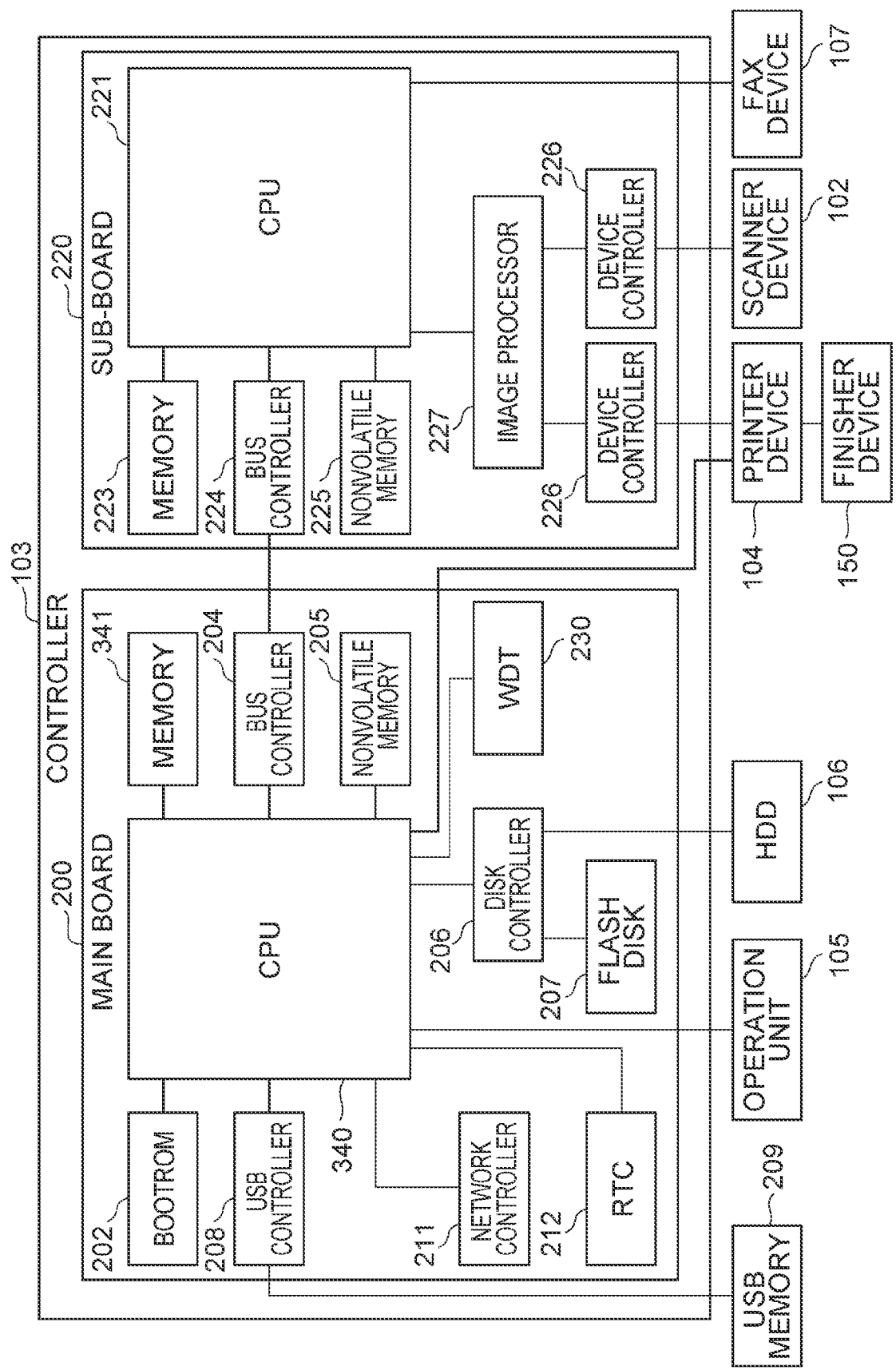
FIG. 3 is a block diagram of an example of a controller (103).

Next, a block diagram of the controller 103 and peripheral devices will be described using FIG. 3. The controller 103 is composed of a main board 200 and a sub-board 220.

The main board 200 is a so-called general-purpose central processing unit (CPU) system. The main board 200 includes a CPU 340 controlling the entire board, a boot ROM 202 including a boot program, and a memory 341 used by the CPU 340 as work memory. The main board 200 also includes a bus controller 204 having a bridge function with an external bus, and a non-volatile memory 205 retaining data even when power is cut off. Meanwhile, the CPU 340 controls a watchdog timer 230 (also referred to as a WDT), which resets the controller 103.

The CPU 340 controls a network controller 211 in order to transmit and receive data to and from the computer 109 via the LAN 108. The CPU 340 controls a real-time clock (RTC) 212 in order to set a current time and a resumption time. The main board 200 further includes a disk controller 206 controlling a storage device, and a flash disk 207 including an SSD, an eMMC, or the like, which is a relatively small-capacity storage device configured of a semiconductor device. The main board 200 also includes a Universal Serial Bus (USB) controller 208 capable of controlling the USB, and so on. A USB memory 209, the operation unit 105, the hard disk 106, and the like are connected externally to the main board 200.

The sub-board 220 is composed of a relatively small general-purpose CPU system and image processing hardware. The sub-board 220 includes a CPU 221 controlling the entire board, a memory 223 used by the CPU 221 as work memory, a bus controller 224 having a bridge function with an external bus, and a non-volatile memory 225 retaining data even when power is cut off. The sub-board 220 further includes an image processor 227 performing real-time digital image processing, and a device controller 226. The scanner device 102 and the printer device 104, which are connected externally to the controller 103, pass digital image data through the device controller 226. A paper device discharged from the printer device 104 is processed with the finisher device 150. The FAX device 107 is directly controlled by the CPU 221.

Note that this drawing is a block diagram and is simplified. For example, the CPU 340, the CPU 221, and the like include a large number of CPU peripheral hardware items, such as chipsets, bus bridges, clock generators, and the like, but they are simplified for the sake of simplification and unnecessary granularity in the explanation, and this block configuration is not intended to limit every embodiment.

The operation of the controller 103 will be described using image copying using a paper device by way of example. When the user gives a copy instruction using the operation nit 105, the CPU 340 sends an image reading instruction to the scanner device 102 via the CPU 221. The scanner device 102 optically scans a paper document into digital image data and inputs it to the image processor 227 via the device controller 226. The image processor 227 performs a direct memory access (DMA) transfer to the memory 223 via the CPU 221 and temporarily saves the digital image data.

Having confirmed that a certain amount or all of the digital image data has entered the memory 223, the CPU 340 issues an image output instruction to the printer device 104 via the CPU 221.

The CPU 221 notifies the image processor 227 of the address of the image data on the memory 223. The image data on the memory 223 is transmitted to the printer device 104 via the image processor 227 and the device controller 226 in accordance with a synchronization signal from the printer device 104. The printer device 104 prints the digital image data to the paper device.

When printing multiple copies, the CPU 340 saves the image data on the memory 223 to the hard disk 106. From the second copy onward, the image data can be sent from the hard disk 106 or the memory 223 to the printer device 104 without receiving it from the scanner device 102.

Power Supply Configuration

Figure 4:
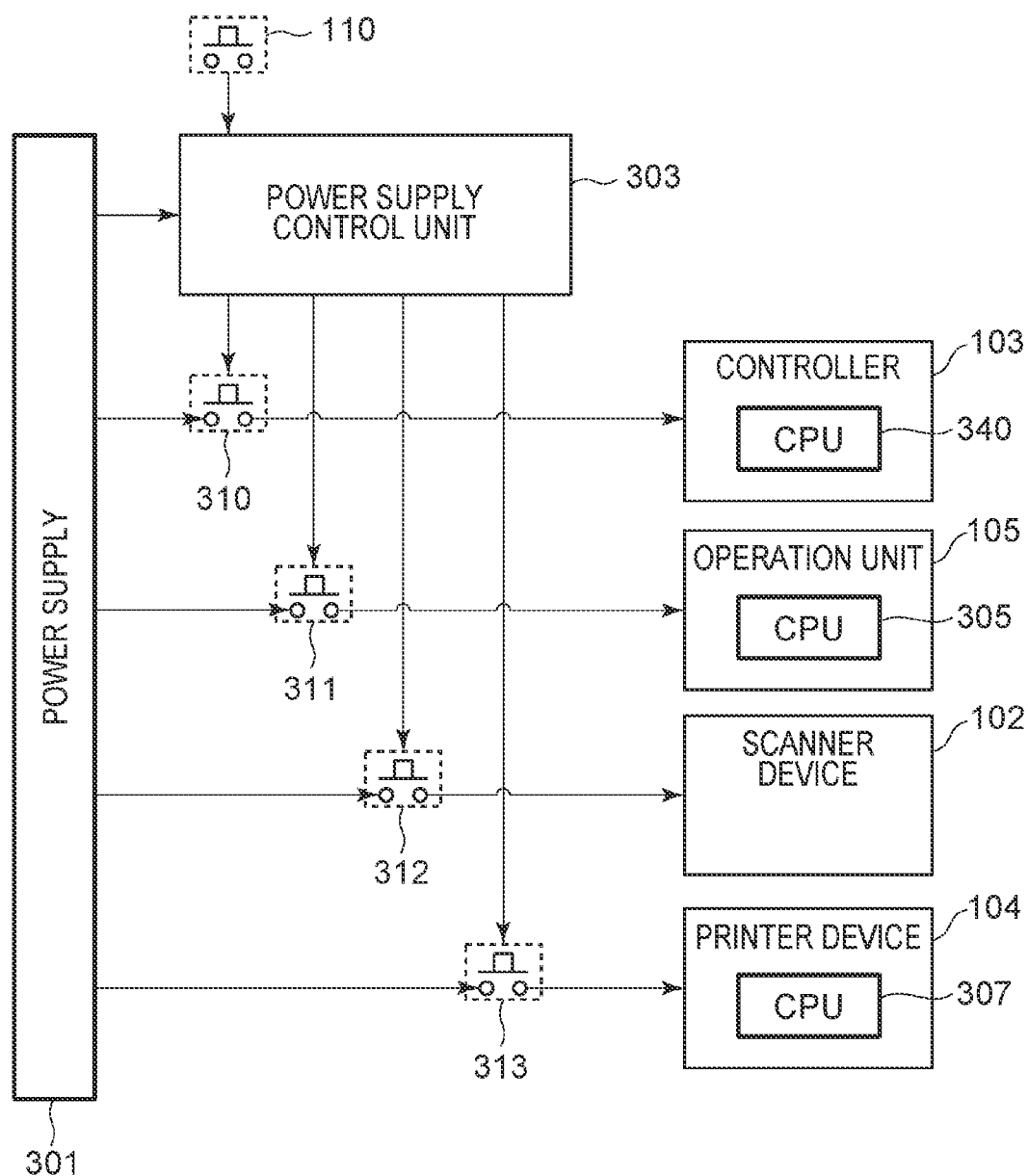
FIG. 4 is a power supply system diagram of an example of the image forming apparatus (101).

FIG. 4 is a block diagram illustrating the power supply configuration of the image forming apparatus 101 illustrated in FIG. 1. Hereinafter, regarding the configurations of the power supply 301, the power supply control unit 303, the controller 103, the operation unit 105, the scanner device 102, and the printer device 104 in the image forming apparatus 101, portions that are related to the present disclosure will be described using FIG. 4.

In FIG. 4, the power supply control unit 303 is constantly supplied with power from the power supply 301 via a power line. However, to maintain minimal power consumption, only the power supply control unit 303 is energized during power-off, and power control is performed.

In the image forming apparatus 101, when the power switch 110 is pressed, the power supply control unit 303 senses this, controls the power switch (P) 310, and supplies power to the CPU 340 of the controller 103. Similarly, the power supply control unit 303 controls the power switch (Q) 311 to supply power to the CPU 305 of the operation unit 105, controls the power switch (R) 312 to supply power to the scanner device 102, and controls the power switch (L) 313 to supply power to the printer device 104.

The CPU 340 of the controller 103 can also control the power switch (Q) 311 by notifying the power supply control unit 303, thereby individually supplying power to the CPU 305 of the operation unit 105. At the same time, the CPU 340 can also control the power switch (R) 312 to supply power to the scanner device 102, and control the power switch (L) 313 to supply power to the printer device 104 individually from the power supply 301. At this time, the power supply of the marking unit 141, the sheet feed unit 142, and the sheet discharge unit 143 of the printer device 104 can also be individually controlled.

Note that the power supply for each block as illustrated in FIG. 4 can be realized by, for example, configuring the power switch 310 in two systems, and in the sleep state, turning off only a relay switch leading to a block that is to be powered off, while leaving the other on. In the shutdown state, relay switches of both systems are turned off. In that case, a power supply control signal is not a binary value, but a multi-value control signal in accordance with the energized state. Although such descriptions are particularly omitted in this example, power is supplied through such control in each of the aforementioned power states, including the sleep state and the shutdown state. This control may be performed by the power supply control unit 303 performing multi-value control of the power switch (P) 310 to supply power to each block of the controller 103. This control may also be performed by the CPU 340 of the controller 103 notifying the power supply control unit 303 to perform multi-value control of the power switch (P) 310, thereby supply power to each block of the controller 103, or may be in any form.

Power Supply when Power Supply Control Unit 303 is Restarted (Rebooted)

Next, a process of reactivating the image forming apparatus 101 will be described.

The CPU 340 of the controller 103 of the image forming apparatus 101 receives a reboot event in the standby state after activation. The reboot event may be issued by an application running on the CPU 340, or may be received by the CPU 340 via the LAN 108 from the computer 109.

Next, the CPU 340 performs a process of terminating the application, a process of saving information on the memory 341 to the HDD 106, a process of terminating the peripherals, and a process of terminating the printer device 104, the scanner device 102, the FAX device 107, the finisher device 150, and so on. The CPU 340 notifies the power supply control unit 303 and transitions to a power-off state.

In the power-off state, the power supply control unit 303 turns off the respective power switches (310, 311, 312, and 313) and cuts off the power to the controller 103, the printer device 104, the scanner device 102, the FAX device 107, the finisher device 150, and so on. The power supply control unit 303 waits for the time for the analog signal of the power supply to decay and reaches zero. It is also possible to shorten the signal waiting time by setting the power-off of each device as a reset instead of turning off the power.

Next, the power supply control unit 303 turns on the respective power switches (310, 311, 312, and 313) and energizes the controller 103, the printer device 104, the scanner device 102, the FAX device 107, the finisher device 150, and so on. The CPU 340 of the controller 103 performs an activation process, and performs a process of initializing the peripherals. The printer device 104, the scanner device 102, the FAX device 107, and the finisher device 150 also perform respective activation processes. Note that, in the present specification, the peripherals refer to configurations other than the CPU 340 mounted on the main board 200, such as the RTC 212 and the watchdog timer (WDT) 230.

Power Supply when Power Supply Control Unit 303 Transitions to Sleep

Next, a sleep transition process of the controller 103 will be described. When the user remains inactive in the active state for a certain period of time, the CPU 340 transitions to the sleep state through the auto sleep timer. The CPU 340 notifies the power supply control unit 303 of the transition to the sleep state, and changes the power supply to the controller 103.

As described above, the power supply for each block can be realized by, for example, configuring the power switch 310 in two systems, such as relay switches, and in the sleep state, turning off only a relay switch leading to a block that is to be powered off, while leaving the other on.

At this time, the CPU 340 can also transition to the sleep state by notifying the power supply control unit 303, turning off the power switch (Q) 311, and stopping power supply from the power supply 301 to the operation unit 105.

At this time, the CPU 340 can transition to the sleep state by notifying the CPU 305 of the operation unit 105 through serial communication or the like, which then allows the CPU 305 of the operation unit 105 to set the operation panel and the peripherals to the power saving state.

Similarly, the scanner device 102 and the printer device 104 can also transition to the sleep state, but its description will be omitted in the present embodiment.

Power Supply when Power Supply Control Unit 303 is in Sleep State

Next, the sleep state of the image forming apparatus 101 will be described. The sleep state is a state which enables a faster activation time compared to a normal activation time while reducing power consumption.

The image forming apparatus 101 transitions to the sleep state when a certain period of time has elapsed while the user remains inactive, when the power saving key on the touchscreen of the operation unit 105 has been pressed, when the set time has been reached, or the like. In the sleep state, power is supplied to the memory 341, an interrupt controller, the network controller 211, the RTC 212, the USB controller 208, and the like of the controller 103. Power is also supplied to the power saving key of the operation unit 105, a portion of the FAX device 107, various sensors, and the like. However, since the factors for resuming from the sleep state differ from system to system, the power supply in the sleep state is not bound to this configuration.

Power Supply when Power Supply Control Unit 303 Resumes from Sleep State

The operation of software when resuming from the sleep state will be described. During the sleep state, the power supply control unit 303 receives one or more interrupts from a network, the RTC 212 detecting a timer or an alarm, the FAX device 107 detecting an incoming call or an off-hook, a software switch, various sensors, a USB detecting plugging or unplugging, communication, or the like, and starts supplying power. More specifically, the interrupts include the cover of the front door of the printer device 104 being opened/closed, a printing sheet being placed/removed on/from the multi-manual feed unit of the printer device 104, the platen of the scanner device 102 being opened/closed, and a document being detected on the auto document feeder of the scanner device 102. The interrupts further include card detection by a near field communication (NFC) card reader, motion sensor detection, an off hook of the handset of the FAX device 107, a FAX incoming call, and so on. The power supply control unit 303 notifies the CPU 340 of the cause of the interrupt, and the CPU 340 receives the notification and performs a process of restoring the state of the software to a normal state, that is, a sleep recovery process.

Next, the sleep recovery process of the controller 103 will be described. On receipt of a pressing event handler of the power saving key, which is one of the sleep recovery factors, during the sleep state, the power supply control unit 303 turns on the power switch 310 and resumes the CPU 340 of the controller 103 from the sleep state. At this time, for example, the power supply control unit 303 performs the multi-value control of the power switch 310 to supply power to each block of the controller 103. Furthermore, the power supply control unit 303 can also resume the CPU 340 from the sleep state by issuing an interrupt signal to the CPU 340; however, its description will be omitted because the sequence is complicated. The CPU 340 notifies the power supply control unit 303, which in turn turns on the power switches (311, 312, and 313) and supplies power to the operation unit 105, the scanner device 102, and the printer device 104. Although the power supply to devices such as the FAX device 107 is not illustrated, it can also be prepared as signals (not illustrated).

Although the aforementioned sleep recovery factor is pressing of the power saving key, it is also possible to resume from the sleep state in response to a network packet and to process the network packet in a sleep intermediate state. On receipt of a network packet which is a sleep recovery factor during the sleep state, the power supply control unit 303 turns on the power switch 310, and resumes the CPU 340 of the controller 103 from the sleep state. At this time, if the received network packet is interpreted as a print job, the CPU 340 notifies the power supply control unit 303, and the power supply control unit 303 turns on the power switch 313 to supply power to the printer device 104. In this case, processing can be performed without supplying power to the operation unit 105 and the scanner device 102. In other words, it is not necessary to supply power to the operation unit 105 if the user does not use the touchscreen, for example. In addition, it is not necessary to supply power to the printer device 104 or the scanner device 102 when no print job has been generated or when it is unnecessary to obtain device information.

Power Supply when Power Supply Control Unit 303 Enters Sleep State Again

The CPU 340 again transitions to the sleep state when copying by the user or a print job over the network is completed. In other words, the CPU 340 notifies the power supply control unit 303 of a transition to the sleep state. With a power supply control signal, the power supply control unit 303 turns off the power switches (311, 312, and 313), and stops supplying power except to the controller 103. At this time, for example, the power supply control unit 303 can also allow the CPU 340 to transition to the sleep state by having the CPU 340 in an interrupt signal standby state, performing the multi-value control of the power switch 310, and turning off each block of the controller 103. However, its detailed description will be omitted because the sequence is complicated.

Description of Flowchart of First Embodiment

Figure 5:
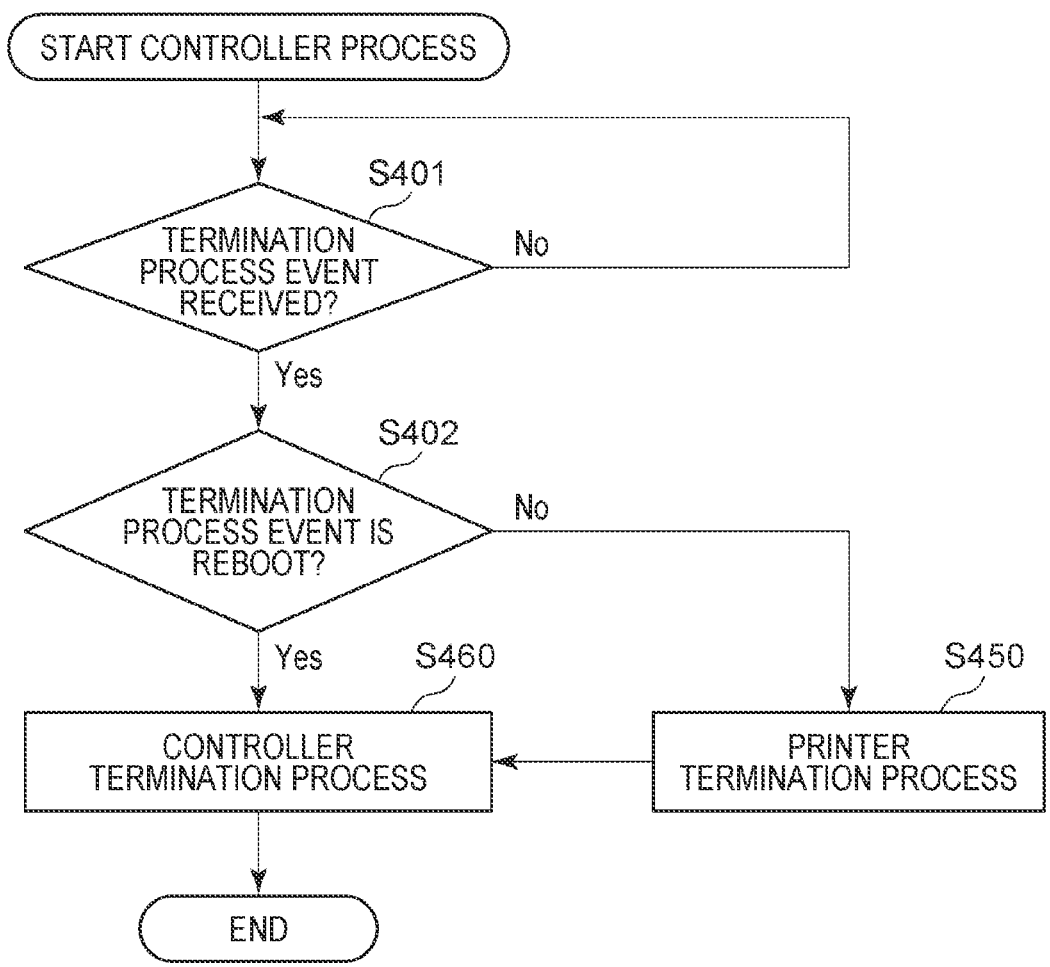
FIG. 5 is an example of a flowchart in a first embodiment.

FIG. 5 is a flowchart of the first embodiment, which most plainly represents the features of some embodiments.

The issue with the first embodiment is that a termination process of the printer device 104 may take a long time.

The first embodiment is different from the conventional technology in the point that, although a termination process of the controller 103 is performed on receipt of a reboot event, a termination process of the printer device 104 is skipped even if the printer device 104 is attached.

The flowchart of FIG. 5 will be described.

The CPU 340 of the image forming apparatus 101 starts from the standby state where an executable event is receivable.

The CPU 340 receives a system termination process event (S401). Termination process events include shutdowns, reboots, transitions to a fast bootable standby state, and so on. If the received termination process event is an event other than a reboot (S402; No), the CPU 340 performs a termination process of the printer device 104 (S450), and performs a termination process of the controller 103 (S460). In contrast, if the received termination process event is a reboot (S402; Yes), the CPU 340 does not perform a termination process of the printer device 104, but performs a termination process of the controller 103 (S460).

The termination process event may be in any form, whether the CPU 340 starts processing through system operation or the CPU 340 starts processing in response to an event received from the computer 109 via the LAN 108.

If the received termination process event is a reboot, a termination process of the controller 103 is performed in S460, and the power supply control unit 303 then turns on the respective power switches (310, 311, 312, and 313). Then, the CPU 340 initiates power supply to the controller 103, the printer device 104, the scanner device 102, the FAX device 107, the finisher device 150, and so on. The CPU 340 of the controller 103 performs an activation process, and performs a process of initializing the peripherals. The printer device 104, the scanner device 102, the FAX device 107, and the finisher device 150 also perform respective activation processes.

If the termination process event is a reboot, the power switch 110 remains on while a shutdown process is being performed. Therefore, if the termination process event is a reboot, when a termination process of the controller 103 is performed in S460, the power supply control unit 303 turns on the respective power switches (310, 311, 312, and 313) in response to the power switch 110 being on. Accordingly, the image forming apparatus 101 is rebooted. The above description describes the case where the power switch 110 is a seesaw switch. Depending on the shape of the switch, such as a tact switch, there may be switches that do not have an off and on state. In such a case, the CPU 340 can also reboot the system by notifying the power supply control unit 303 of a reboot. The detailed description of a method of controlling the reboot is omitted.

Effect of First Embodiment

An effect of the first embodiment is that the downtime when the image forming apparatus 101 reboots can be shortened. In other words, when the image forming apparatus 101 starts rebooting, a controller termination process is executed without notifying the printer device 104 of the termination. Accordingly, when the system setting information is changed, for example, if rebooting is performed to reflect the settings, a termination process of the printer device 104 can be skipped, and the downtime of the image forming apparatus 101 can be shortened.

Description of Flowchart of Second Embodiment

Figure 6:
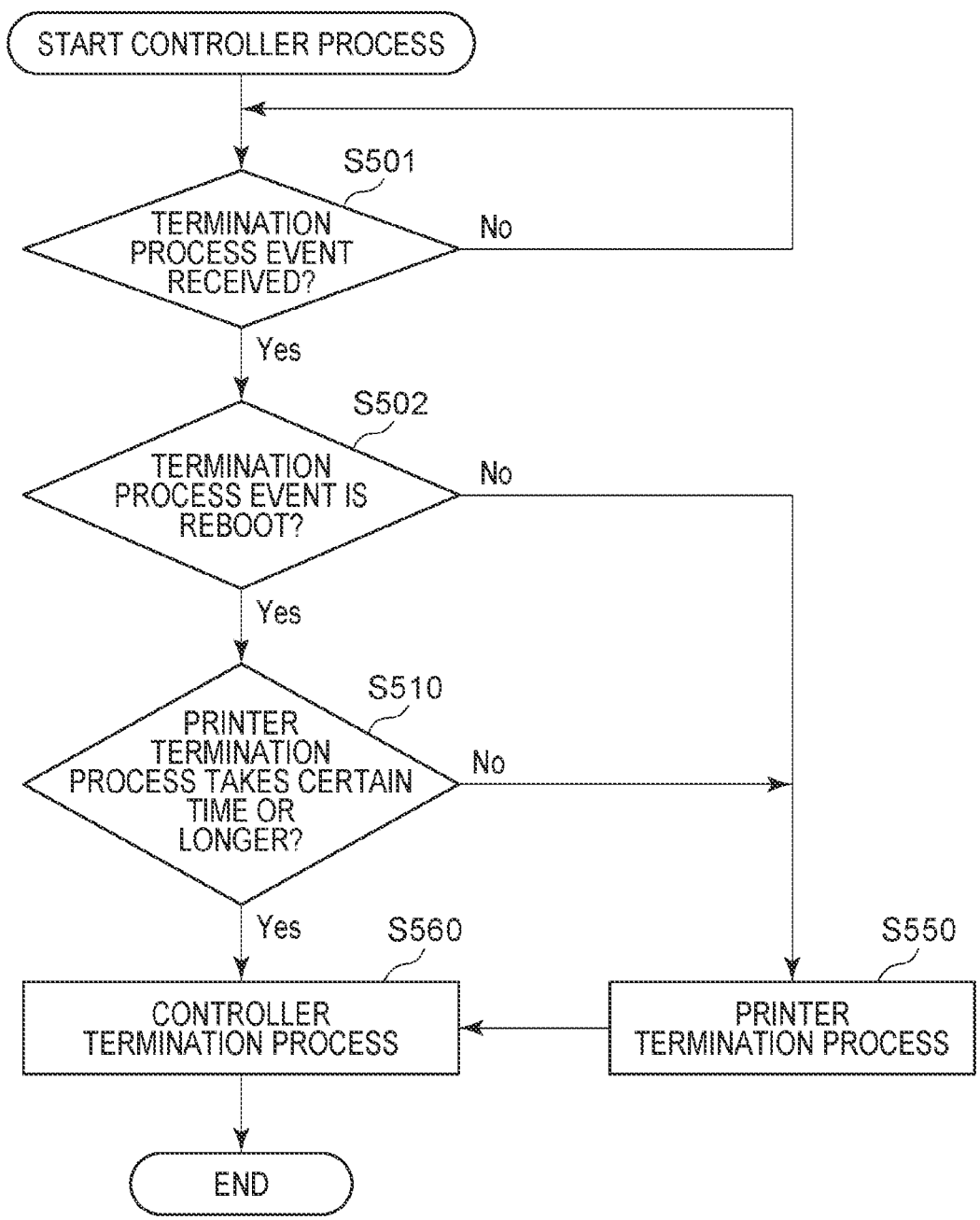
FIG. 6 is an example of a flowchart in a second embodiment.

FIG. 6 is a flowchart of a second embodiment.

The issue with the second embodiment is that, when the printer termination process time is short, it may not be possible to implement a termination process of the printer device 104, which should be performed if possible. As a result, after reactivation, the initialization process cannot recover properly, leading to an error state.

Accordingly, in the second embodiment, a termination process of the controller 103 is performed on receipt of a reboot event. At that time, it is different from the conventional technology in the point that it is checked whether the termination process time of the printer device 104 is greater than or equal to a certain period of time, and, if the termination process time is greater than or equal to the certain period of time, a termination process of the printer device 104 is skipped.

The flowchart of FIG. 6 will be described.

The CPU 340 of the image forming apparatus 101 starts from the standby state where an executable event is receivable.

The CPU 340 receives a system termination process event (S501). Termination process events include shutdowns, reboots, transitions to a fast bootable standby state, and so on. If the received termination process event is an event other than a reboot (S502; No), the CPU 340 performs a termination process of the printer device 104 (S550), and performs a termination process of the controller 103 (S560). In contrast, if the received termination process event is a reboot (S502; Yes), the CPU 340 determines whether the termination process time of the printer device 104 is greater than or equal to a certain period of time (S510). If a termination process of the printer device 104 takes time less than or equal to the certain period of time, the CPU 340 performs a termination process of the printer device 104 (S550), and performs a termination process of the controller 103 (S560). In contrast, if a termination process of the printer device 104 takes time greater than or equal to the certain period of time, the CPU 340 does not perform a termination process of the printer device 104, but performs a termination process of the controller 103 (S560).

As the termination process time of the printer device 104, the CPU 340 of the controller 103 may obtain a static value saved in the hard disk 106 or the like. In addition, as the termination process time of the printer device 104, the CPU 340 of the controller 103 may obtain a dynamic value by inquiring the CPU 307 of the printer device 104 and receiving a response. In addition, the termination process time of the printer device 104 may be determined by a method that determines whether the time is greater than or equal to a certain period of time using a flag, or may be in any form.

Effect of Second Embodiment

An effect of the second embodiment is that the downtime when the image forming apparatus 101 reboots can be shortened. In other words, when the image forming apparatus 101 starts rebooting, if the termination process time of the printer device 104 is long, a controller termination process is executed without notifying the printer device 104 of the termination. As a result, when the system setting information is changed, rebooting is performed to reflect the settings. At this time, if the termination process time of the printer device 104 is long, a termination process of the printer device 104 can be skipped, and the downtime of the image forming apparatus 101 can be shortened.

Description of Flowchart of Third Embodiment

Figure 7:
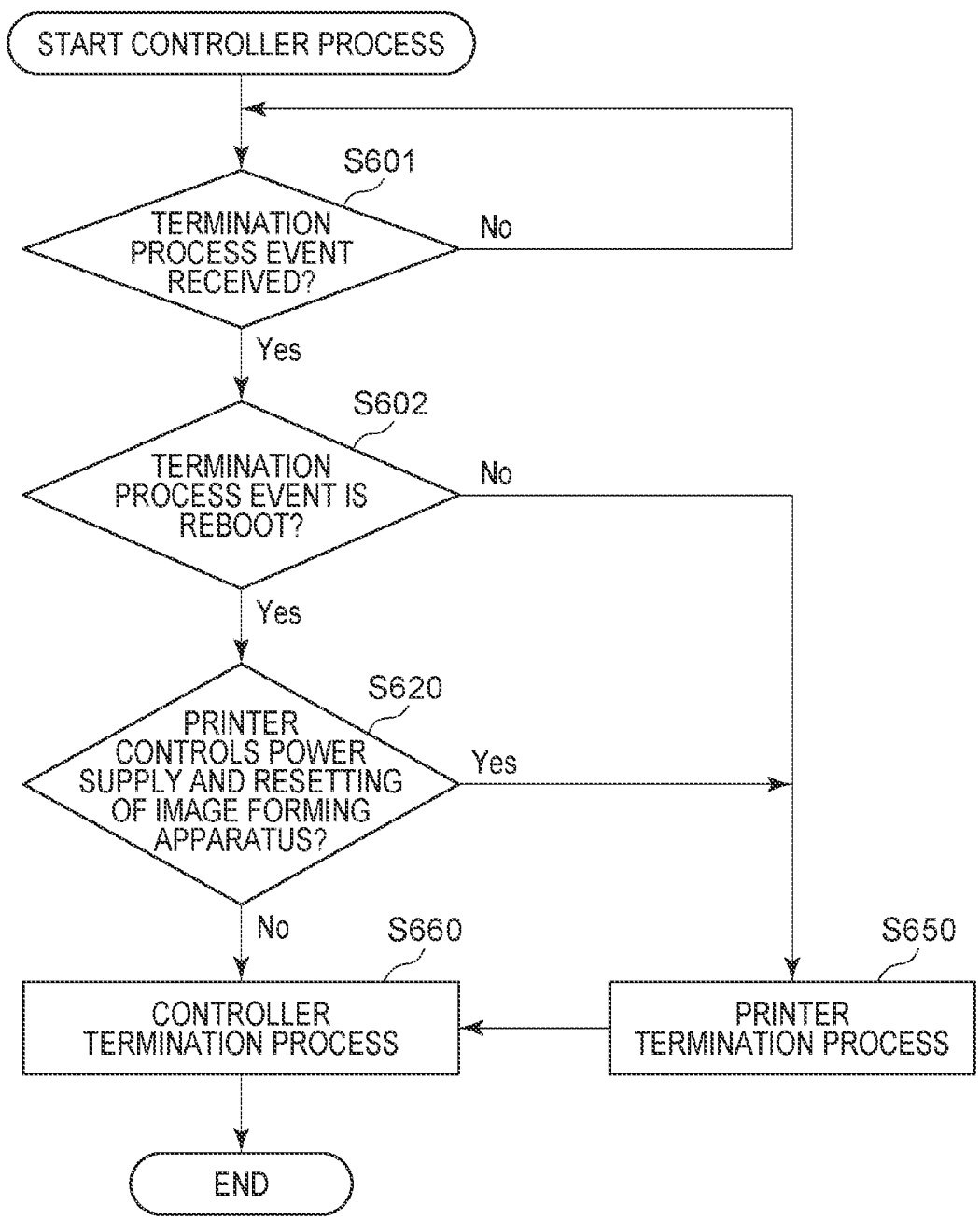
FIG. 7 is an example of a flowchart in a third embodiment.

FIG. 7 is a flowchart of a third embodiment.

The issue with the third embodiment is that, when the printer controls the power supply of the entire system, if the controller is simply rebooted as in the first embodiment, the entire image forming apparatus is not rebooted. As a result, an error state may occur after reactivation.

Accordingly, in the third embodiment, a termination process of the controller 103 is performed upon receipt of a reboot event. At that time, the power supply configuration of the image forming apparatus 101 is checked, and if the printer device 104 does not control the power supply of the entire image forming apparatus 101, a termination process of the printer device 104 is skipped, which is different from the conventional technology.

Power Supply Configuration of Third Embodiment

The power supply configuration in which the controller 103 controls the power supply has been previously described in the power supply configuration of the first embodiment illustrated in FIG. 4. The power supply configuration in which the printer device 104 controls the power supply will be described below using the power supply configuration in FIG. 4 in the third embodiment.

FIG. 4 is a block diagram illustrating the power supply configuration of the image forming apparatus 101 illustrated in FIG. 1. Hereinafter, regarding the power supply 301, the power supply control unit 303, the controller 103, the operation unit 105, the scanner device 102, and the printer device 104 in the image forming apparatus 101, portions that are related to the present disclosure will be described using FIG. 4.

In FIG. 4, the power supply control unit 303 is constantly supplied with power from the power supply 301 via a power line. However, to maintain minimal power consumption, only the power supply control unit 303 is energized during power-off, and power control is performed.

In the image forming apparatus 101, when the power switch 110 is pressed, the power supply control unit 303 senses this, controls the power switch (L) 313, and supplies power to the CPU 307 of the printer device 104. Similarly, the power supply control unit 303 controls the power switch (P) 310 to supply power to the controller 103, controls the power switch (Q) 311 to supply power to the CPU 305 of the operation unit 105, and controls the power switch (R) 312 to supply power to the scanner device 102.

The CPU 307 of the printer device 104 can also control the power switch (P) 310 by notifying the power supply control unit 303, thereby individually supplying power to the CPU 340 of the controller 103.

The CPU 140 of the controller 103 can also control the power switch (Q) 311 by notifying the power supply control unit 303, thereby individually supplying power from the power supply 301 to the CPU 305 of the operation unit 105. The CPU 140 of the controller 103 can also control the power switch (R) 311 by notifying the power supply control unit 303, thereby individually supplying power from the power supply 301 to the scanner device 102.

At this time, the CPU 307 of the printer device 104 can individually control the power supply of the marking unit 141, the sheet feed unit 142, and the sheet discharge unit 143 of the printer device 104 by notifying the power supply control unit 303.

Note that the power supply for each block as illustrated in FIG. 4 can be realized by, for example, configuring the power switch (L) 313 in two systems, and in the sleep state, turning off only a relay switch leading to a block that is to be powered off, while leaving the other on. In the shutdown state, relay switches of both systems are turned off. In that case, a power supply control signal is not a binary value, but a multi-value control signal in accordance with the energized state. Although such descriptions are particularly omitted in this example, power is supplied through such control in each of the aforementioned power states, including the sleep state and the shutdown state. This control may be performed by the power supply control unit 303 performing multi-value control of the power switch (P) 313 to supply power to each block of the printer device 104. This control may also be performed by the CPU 307 of the printer device 104 notifying the power supply control unit 303 to perform multi-value control of the power switch (L) 313, thereby supplying power to each block of the printer device 104, or may be in any form.

In the power supply system diagram of FIG. 4 in the third embodiment, the printer device 104 controls the power supply of the entire image forming apparatus 101, and the power supply from the power supply 301 has a hierarchical structure. The printer device 104 controls the power supply to the controller 103. The controller 103 controls the power supply to the operation unit 105 and the scanner device 102. If the CPU 307 of the printer device 104 controls the power supply of the entire image forming apparatus 101, rebooting the printer device 104 allows the controller 103, the operation unit 105, and the scanner device 102 to reboot. In addition, if the CPU 307 of the printer device 104 controls the power supply of the entire image forming apparatus 101, controlling the controller 103 to reboot allows the operation unit 105 and the scanner device 102 to reboot, while allowing the printer device 104 not to reboot.

Description of Flowchart of Third Embodiment

The flowchart of FIG. 7 will be described.

The CPU 340 of the image forming apparatus 101 starts from the standby state where an executable event is receivable.

The CPU 340 receives a system termination process event (S601). Termination process events include shutdowns, reboots, transitions to a fast bootable standby state, and so on. If the received termination process event is an event other than a reboot (S602; No), the CPU 340 performs a termination process of the printer device 104 (S650), and performs a termination process of the controller 103 (S660). If the received termination process event is a reboot (S602; Yes), the CPU 340 determines whether the printer device 104 controls the power supply of the entire image forming apparatus 101 (S620). If the printer device 104 controls the power supply of the entire image forming apparatus 101 (S620; Yes), the CPU 340 performs a termination process of the printer device 104 (S650), and a termination process of the controller 103 (S660). In contrast, if the printer device 104 does not control the power supply of the entire image forming apparatus 101 (S620; No), the CPU 340 does not perform a termination process of the printer device 104, but performs a termination process of the controller 103 (S660).

As to whether the printer device 104 controls the power supply of the entire image forming apparatus 101, the CPU 340 of the controller 103 may obtain a static value saved in the hard disk 106 or the like. In addition, as to whether the printer device 104 controls the power supply of the entire image forming apparatus 101, the CPU 340 of the controller 103 may obtain a dynamic value by obtaining a value from a register of the power supply control unit 303. A detailed description of the above will be omitted, but any form may be used.

Effect of Third Embodiment

An effect of the third embodiment is that the downtime when the image forming apparatus 101 reboots can be shortened. In other words, the image forming apparatus 101 starts rebooting. At this time, if the printer device 104 does not control the power supply of the entire image forming apparatus 101, the printer device 104 is not notified of the termination, and a controller termination process is executed. As a result, when the system configuration information is changed, rebooting is performed to reflect the settings. At this time, if the printer device 104 does not control the power supply of the entire image forming apparatus 101, a termination process of the printer device 104 can be skipped, and the downtime of the image forming apparatus 101 can be shortened.

Description of Flowchart of Fourth Embodiment

Figure 8:
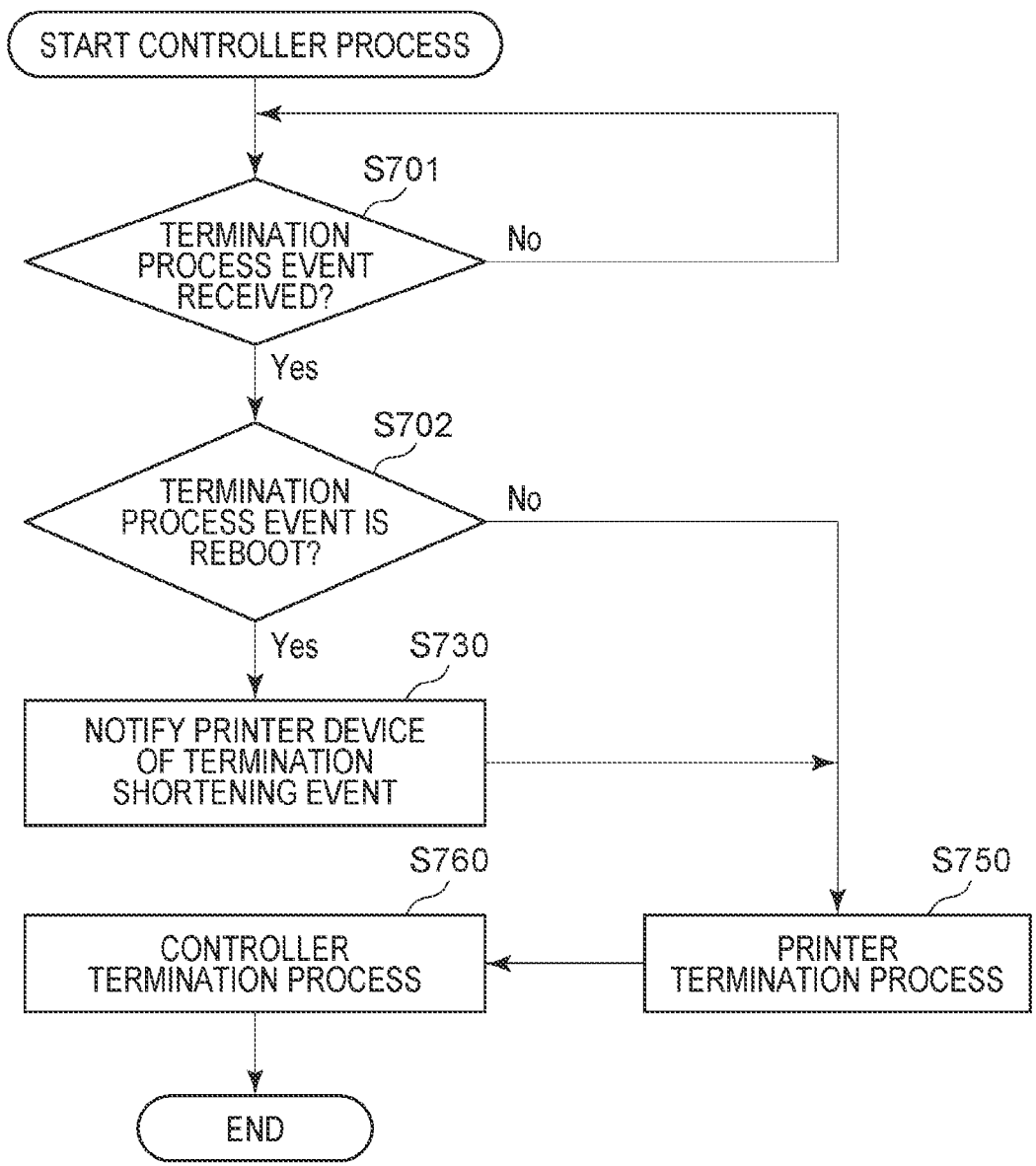
FIG. 8 is an example of a flowchart in a fourth embodiment.

FIG. 8 is a flowchart of a fourth embodiment.

The issue with the fourth embodiment is that, when the printer termination process time is short, it may not be possible to implement a termination process of the printer device 104, which should be performed if possible. As a result, after reactivation, the initialization process cannot recover properly, leading to an error state.

Therefore, in the fourth embodiment, on receipt of a reboot event, an event for shortening a termination process, such as a reboot, is sent to the printer device 104, and a termination process of the printer device 104 is shortened when rebooting. In contrast, in the case of a shutdown or a transition to a fast bootable state, an event that does not shorten a termination process, such as a shutdown, is sent, and a termination process of the printer device 104 is not shortened, which is different from the conventional technology.

The flowchart of FIG. 8 will be described.

The CPU 340 of the image forming apparatus 101 starts from the standby state where an executable event is receivable.

The CPU 340 receives a system termination process event (S701). Termination process events include shutdowns, reboots, transitions to a fast bootable standby state, and so on. If the received termination process event is an event other than a reboot (S702; No), the CPU 340 performs a termination process of the printer device 104 (S750), and performs a termination process of the controller 103 (S760). In contrast, if the received termination process event is a reboot (S702; Yes), the CPU 340 notifies the printer device 104 of a termination shortening event (S730). Subsequently, the CPU 340 performs a termination process of the printer device 104 (S750) and performs a termination process of the controller 103 (S760).

Here, the termination shortening event refers to performing a portion of a printer termination process. As described above, there are two types of printer termination processes, one that takes time and the other that does not take time. Time-consuming processes include controlling fan rotation for printer cooling, controlling fan rotation for out-of-machine ozone discharge, and so on. Time-non-consuming processes include the separation movement of the fixing drum, the closing operation of the charging shutter, and so on. Here, upon notification of a termination shortening event, a printer termination process performed in S750 is performed by performing either or both of the separation movement of the fixing drum and the closing operation of the charging shutter, which do not take time, while not performing fan rotation control.

Effect of Fourth Embodiment

An effect of the fourth embodiment is that the downtime when the image forming apparatus 101 reboots can be shortened. In other words, when the image forming apparatus 101 starts rebooting, the image forming apparatus 101 notifies the printer device 104 of a termination shortening event, performs a termination process of the printer device 104, and executes a termination process of the controller 103. Accordingly, when the system setting information is changed, for example, if rebooting is performed to reflect the settings, part of a termination process of the printer device 104 can be skipped, and the downtime of the image forming apparatus 101 can be shortened.

OTHER EMBODIMENTS

Although various examples and embodiments of the present disclosure have been described above, the spirit and scope of the present disclosure are not limited to the specific descriptions in the present specification.

Some embodiments can also be realized by a process of supplying a program that realizes one or more functions of the above-described embodiments to a system or apparatus via a network or a storage medium, and reading and executing the program by one or more processors in a computer of the system or apparatus. Some embodiments can also be realized by a circuit (e.g., an application specific integrated circuit (ASIC)) that realizes one or more functions.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-153335, which was filed on Sep. 27, 2022 and which is hereby incorporated by reference herein in its entirety.

What is claimed is:

1. An image forming apparatus capable of transitioning between at least a standby state and a termination state, the image forming apparatus comprising:
a controller; and
a printer device configured to form an image on a recording sheet,
wherein the controller is configured to receive an event for transitioning a state of the image forming apparatus,
wherein the controller is configured to, by executing a termination process of the printer device and a termination process of the controller, transition from the standby state to the termination state, and
wherein, when a reboot event is received by the controller, the controller controls whether to execute a termination process of the printer device based on a certain condition of the image forming apparatus.

2. The image forming apparatus according to claim 1, further comprising:

a power supply control unit configured to control energization of the controller,
wherein, when a reboot event is received and a termination process of the controller is completed, the power supply control unit supplies power to the controller.

3. The image forming apparatus according to claim 1, wherein, when a reboot event is received by the controller, the controller determines a time taken for a termination process of the printer device as the certain condition, and, if it is determined that the time taken is greater than or equal to a certain period of time, controls not to execute a termination process of the printer device.

4. The image forming apparatus according to claim 1, wherein:
when a reboot event is received by the controller, it is determined, as the certain condition, whether the printer device controls power supply of the image forming apparatus; and
when the printer device controls power supply of the image forming apparatus, the controller controls to execute a termination process of the printer device.

5. The image forming apparatus according to claim 1, wherein, when a termination process of the printer device ends, a termination process of the controller is then executed.

6. The image forming apparatus according to claim 1, wherein a termination process of the printer device includes at least a process of rotating a fan included in the printer device.

7. The image forming apparatus according to claim 1, wherein, when a reboot event is received by the controller, the controller controls not to execute a termination process of the printer device by not notifying the printer device of the termination notification.

8. The image forming apparatus according to claim 1, wherein:
a termination process of the printer device includes a first termination process and a process of rotating a fan included in the printer device;
when a reboot event is received by the controller, the controller controls to execute, as a shortened version of a termination process of the printer device, the first termination process of the printer device but not to execute a process of rotating the fan.

9. The image forming apparatus according to claim 8, wherein the first termination process is a termination process that does not take time.

10. The image forming apparatus according to claim 8, wherein the first termination process includes at least one or more of a separation movement of a fixing drum and a closing operation of a charging shutter.

11. The image forming apparatus according to claim 1, wherein the reboot event is an event for bringing the image forming apparatus, which is in the standby state, to the termination state and then back to the standby state again.

12. A control method for an image forming apparatus including a controller and a printer device configured to form an image on a recording sheet, the control method comprising:
receiving an event for transitioning a state of the image forming apparatus; and
controlling to, by executing a termination process of the printer device and a termination process of the controller, transition from the standby state to the termination state,
wherein, when a reboot event is received, it is controlled, in the controlling, whether to execute a termination process of the printer device based on a certain condition of the image forming apparatus.

13. The control method according to claim 12, wherein:
the image forming apparatus includes a power supply control unit configured to control energization of the controller, and
when a reboot event is received and a termination process of the controller is completed, the power supply control unit supplies power to the controller.

14. The control method according to claim 12, wherein, when a reboot event is received, a time taken for a termination process of the printer device is checked as the certain condition, and, if it is determined that the time taken is greater than or equal to a certain period of time, control is performed not to execute a termination process of the printer device.

15. A non-transitory computer-readable medium storing computer-executable instructions that, when executed by a computer, cause the computer to execute a control method for an image forming apparatus including a controller and a printer device that is configured to form an image on a recording sheet,
the control method comprising:
receiving an event for transitioning a state of the image forming apparatus; and
controlling to, by executing a termination process of the printer device and a termination process of the controller, transition from the standby state to the termination state,
wherein, when a reboot event is received, it is controlled, in the controlling, whether to execute a termination process of the printer device based on a certain condition of the image forming apparatus.

16. An image forming apparatus capable of transitioning between at least a standby state and a termination state, the image forming apparatus comprising:
a controller; and
a printer device configured to form an image on a recording sheet,
wherein the controller is configured to receive an event for transitioning a state of the image forming apparatus,
wherein the controller is configured to, by executing a termination process of the printer device and a termination process of the controller, transition from the standby state to the termination state, and
wherein, when a reboot event is received by the controller, the controller controls to execute a termination process of the controller without executing a termination process of the printer device.

17. The image forming apparatus according to claim 16, further comprising:

a power supply control unit configured to control energization of the controller,
wherein, when a reboot event is received and a termination process of the controller is completed, the power supply control unit supplies power to the controller.

18. The image forming apparatus according to claim 16, wherein, when a termination process of the printer device ends, a termination process of the controller is then executed.

19. The image forming apparatus according to claim 16, wherein a termination process of the printer device includes at least a process of rotating a fan included in the printer device.

20. The image forming apparatus according to claim 16, wherein, when a reboot event is received by the controller, the controller controls not to execute a termination process of the printer device by not notifying the printer device of the termination notification.

21. The image forming apparatus according to claim 16, wherein the reboot event is an event for bringing the image forming apparatus, which is in the standby state, to the termination state and then back to the standby state again.

22. A control method for an image forming apparatus including a controller and a printer device configured to form an image on a recording sheet, the control method comprising:
receiving an event for transitioning a state of the image forming apparatus; and
controlling to, by executing a termination process of the printer device and a termination process of the controller, transition from the standby state to the termination state,
wherein, when a reboot event is received, a termination process of the controller is executed without executing a termination process of the printer device.

23. A non-transitory computer-readable medium storing computer-executable instructions that, when executed by a computer, cause the computer to execute a control method for an image forming apparatus including a controller and a printer device that is configured to form an image on a recording sheet,
the control method comprising:
receiving an event for transitioning a state of the image forming apparatus; and
controlling to, by executing a termination process of the printer device and a termination process of the controller, transition from the standby state to the termination state,
wherein, when a reboot event is received, a termination process of the controller is executed without executing a termination process of the printer device.

* * * * *